(12) United States Patent  
Homma

(10) Patent No.: US 9,398,252 B2  
(45) Date of Patent: Jul. 19, 2016

(54) INFORMATION PROCESSING APPARATUS, INFORMATION PROCESSING SYSTEM AND PROGRAM

(71) Applicant: Takeshi Homma, Kanagawa (JP)

(72) Inventor: Takeshi Homma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 253 days.

(21) Appl. No.: 14/091,714

(22) Filed: Nov. 27, 2013

(65) Prior Publication Data

US 2014/0152761 A1    Jun. 5, 2014

(30) Foreign Application Priority Data

Dec. 3, 2012    (JP) .................................. 2012-264584

(51) Int. Cl.
| | | |
|---|---|---|
| *H04M 7/14* | (2006.01) | |
| *H04N 7/14* | (2006.01) | |
| *H04N 7/15* | (2006.01) | |

(52) U.S. Cl.  
CPC . *H04N 7/147* (2013.01); *H04N 7/15* (2013.01)

(58) Field of Classification Search  
USPC ....................................................... 348/14.08  
See application file for complete search history.

(56) References Cited

U.S. PATENT DOCUMENTS

| 7,688,344 B2 * | 3/2010 | Kimber ............... H04L 12/1822 348/14.08 |
| 8,243,116 B2 * | 8/2012 | Qvarfordt .......... G06K 9/00335 348/14.01 |

FOREIGN PATENT DOCUMENTS

| JP | 11-224152 | 8/1999 |
| JP | 2003-016475 | 1/2003 |
| JP | 2003-109036 | 4/2003 |
| JP | 3593067 | 9/2004 |
| JP | 2006-174480 | 6/2006 |
| JP | 2009-077380 | 4/2009 |
| JP | 2010-239393 | 10/2010 |

OTHER PUBLICATIONS

Takeshi Nishikawa et al. "Visual Filler: Visual Stimuli to Facilitate Smooth Communication over TV Conference System with Transmission Delay", FIT2007, Information Technology Letters, 2007, 6 pages (with Partial Translation).

Hidekazu Tamaki et al. "Smooth Turn-taking in Web Conferences", The Institute of Image Electronic Engineers of Japan, Proceedings of the 29th Versatile Media Appliance conference, Jan. 2011 10 pages (with English Abstract).

* cited by examiner

*Primary Examiner* — Amal Zenati  
(74) *Attorney, Agent, or Firm* — Oblon, McClelland, Maier & Neustadt, L.L.P

(57) ABSTRACT

Disclosed is an information processing apparatus including: a motion information generating unit that obtains information on a first user's motion, and generates first motion information; a transmitting unit that receives, from other information processing apparatus via a transmission line, second motion information on a second user; a motion detecting unit that detects first and a second kinds of motion corresponding respectively to the first and second motion information; a delay detecting unit that detects a transmission delay on the transmission line between the information processing apparatuses; a judging unit that judges whether modifying an object, which represents the second user's motion based on the second motion information, is necessary or not based on the first and second kinds of motion and the transmission delay; a modifying unit that modifies the second motion information; and an object generating unit that generates the object based on the second motion information.

14 Claims, 14 Drawing Sheets

FIG.7

| LABEL | KIND OF MOTION | CRITERION OF MOTION INFORMATION |
|---|---|---|
| 1 | NODDING A HEAD | TIME PERIOD: WITH TIME THRESHOLD<br>FACE, UPPER BODY: INITIALLY, DIRECTLY FACING DIRECTION<br>FACE: TILTING FORWARD BY MORE THAN THRESHOLD ANGLE (E.G. 5 DEGREES) WITHIN THRESHOLD TIME PERIOD<br>FACE: RESTORED WITHIN THRESHOLD TIME AFTER FORWARD TILTING<br>UPPER BODY: DISPLACEMENT WITHIN THRESHOLD VALUE |
| 2 | LOOKING AWAY | AT CERTAIN TIME POINT, ROTATION ANGLE OF FACE IS GREATER THAN OR EQUAL TO THRESHOLD VALUE WITH RESPECT TO DIRECTLY FACING DIRECTION |
| 3 | SHAKING A HEAD | TIME: WITH TIME THRESHOLD<br>FACE: ROTATION ANGLE IS GREATER THAN THRESHOLD FROM DIRECTLY FACING DIRECTION WITHIN TIME THRESHOLD IN BOTH LEFT AND RIGHT<br>FACE: RESTORED TO DIRECTLY FACING DIRECTION WITHIN TIME THRESHOLD |
| 4 | MOVING A HAND | UPPER ARM, FRONT ARM: POSITIONS AND ANGLES CHANGE BEYOND THRESHOLD RANGE |
| 5 | SPEAKING | VOICE IS DETECTED<br>LIPS SHIFT |
| 6 | NO MOTION | NO PART CHANGING BEYOND THRESHOLD RANGE WITHIN PREDETERMINED TIME PERIOD |
| 7 | UNCLEAR MOTION | NOT CORRESPOND TO NO MOTION, BUT CANNOT BE JUDGED |

FIG.8

| LABEL | KIND OF MOTION | MODIFIABILITY |
|---|---|---|
| 1 | NODDING A HEAD | YES |
| 2 | LOOKING AWAY | YES |
| 3 | SHAKING A HEAD | NO |
| 4 | MOVING A HAND | NO |
| 5 | SPEAKING | NO |
| 6 | NO MOTION | YES |
| 7 | UNCLEAR MOTION | NO |

FIG.9

| MOTION REQUIREMENT LABEL | MOTION CHANGE AS MOTION REQUIRING RESPONSE |
|---|---|
| 1 | FROM SPEAKING TO NOT SPEAKING |
| 2 | FROM NOT SPEAKING TO SPEAKING |
| 3 | FROM NO MOTION TO MOVING A HAND |
| 4 | FROM LOOKING AWAY TO LOOKING STRAIGHT |

FIG.10

| MOTION REQUIREMENT LABEL | MODIFIED MOTION | TIME FOR BEGINNING MODIFYING |
|---|---|---|
| 2 | LOOKING AT SPEAKER | AFTER 150 ms |
| 1 | NODDING A HEAD | AFTER 200 ms |
| 3 | LOOKING AT HAND | AFTER 130 ms |
| 4 | LOOKING AT AGENT OF MOTION | AFTER 200 ms |

FIG.11

| MOTION REQUIREMENT LABEL | MODIFIED MOTION | TIME FOR BEGINNING MODIFYING |
|---|---|---|
| 2 | LOOKING AT SPEAKER OR NODDING A HEAD | AFTER 150 ms |
| 1 | NODDING A HEAD | AFTER 100 TO 200 ms |
| 3 | LOOKING AT HAND OR LOOKING AT AGENT OF MOTION | AFTER 130 TO 230 ms |
| 4 | LOOKING AT AGENT OF MOTION OR NO MODIFICATION | AFTER 200 ms |

FIG.12

| MOTION REQUIREMENT LABEL | DELAY TIME(ms) | MODIFIED MOTION | TIME FOR BEGINNING MODIFYING |
|---|---|---|---|
| 2 | 300 TO 600 | LOOKING AT SPEAKER | AFTER 150 ms |
| 2 | MORE THAN 600 | LOOKING AT SPEAKER, AND NODDING A HEAD | AFTER 100 TO 200 ms |
| 3 | 350 TO 700 | LOOKING AT AGENT OF MOTION | AFTER 130 TO 230 ms |
| 3 | MORE THAN 700 | LOOKING AT AGENT OF MOTION, AND LOOKING AT HAND OR NODDING A HEAD | AFTER 200 ms |

FIG.19

| TIMING OF MODIFYING | MOTION BEFORE MODIFYING | MOTION AFTER MODIFYING |
|---|---|---|
| 1. AT BEGINNING OF SPEAKING | NO CHANGE: BEFORE DETECTING UTTERANCE | LOOKING AT SPEAKER |
| 2. AT FINISHING OF SPEAKING | CONTINUE TO LISTEN: BEFORE DETECTING FINISHING OF SPEAKING | NODDING SLIGHTLY AND ENDING RESPONSE LISTENING TO SPEAKER |

INFORMATION PROCESSING APPARATUS, INFORMATION PROCESSING SYSTEM AND PROGRAM

BACKGROUND OF THE INVENTION

1. Field of the Invention

The disclosures herein generally relate to an information processing apparatus, an information processing system and a program thereof which performs data communication with other apparatus via a transmission line.

2. Description of the Related Art

A remote conference system, including a video conference system which realizes participating in a conference from remote locations by connecting plural terminal devices via a transmission line, such as the internet, and sending and receiving video and voice data bi-directionally, has already been known.

In the system sending and receiving video data, however, according to a state of the transmission line, such as insufficiency of bandwidth, a video image may be degraded or interrupted. For the above problem, Japanese Published Patent Application No. H11-224152 discloses sending and receiving information related only to user's motions, which is far lees than real video data, and anthropomorphic images are displayed. According to this art, conducting a remote conference via a transmission line with narrower bandwidth becomes possible.

However, in the remote conference system according to the related art, in which motion information is sent and received merely handles the problem arising due to the state of bandwidth. In communicating with a remote location via a transmission line, a delay, in addition to bandwidth, may inhibit smooth communication.

In a face-to-face communication, the time from an utterance on one side till a response, such as an utterance or a motion on the other side, is quite short. In communication via a transmission line, however, a delay for a round trip may occur until receiving a response from the other side.

If the above delay becomes greater than a predetermined length, the frequency of occurrences of silences and overlapping of speaking becomes greater than in the face-to-face communication, and thus the communication becomes non-smooth. For handling this problem, Takeshi Nishikawa, Hiroaki Kawashima and Takashi Matsuyama, "Visual Filler: Visual Stimuli to Facilitate Smooth Communication over TV Conference System with Transmission Delay", FIT2007, Information Technology Letters, pp. 311-314, 2007, proposes a method of reducing a choppy communication due to transmission delays in a communication using real video data, by drawing an object showing the delay during a time period corresponding to the delay.

A problem arising due to the transmission delay in a communication using a transmission line will be explained here. In the remote conference system according to the related art, a client terminal translates received data as it is and outputs it to an output device. In this case, if a delay time becomes greater than a predetermined value, a user receives a response from the other side displayed on the terminal after the delay time, and then smooth communication may become difficult.

The reason of the above difficulty is that when for example the transmission delay for one way is 500 ms i.e. the transmission delay for round trip is 1000 ms, a response by the receiver to a motion of the speaker's hand is drawn on the client terminal used by the speaker after a delay of at least 1000 ms.

Generally, in the face-to-face communication, a reaction is often given within 200 ms including an unconscious reaction. Therefore, the communication via the transmission line is conducted under an unnatural environment for communication.

However, in a face-to-face conversation, a "pause" is often longer than several hundreds of milliseconds. Generally, such a "pause" is not recognized as unnatural. This is because that the person, who will respond to the utterance, performs a motion to fill the "pause". The motion to fill the "pause" is, for example, moving the person's body, speaking a meaningless word, such as an interjection, or the like.

Takeshi Nishikawa, Hiroaki Kawashima and Takashi Matsuyama, "Visual Filler: Visual Stimuli to Facilitate Smooth Communication over TV Conference System with Transmission Delay", discloses an object expressing the "pause". However, displaying such an object in the real images is unnatural in a human communication.

Furthermore, overlapping the object disclosed in Japanese Published Patent Application No. H11-224152 with the anthropomorphic object corresponding to the motion information and displaying the overlapped image are also unnatural in human communication.

SUMMARY OF THE INVENTION

It is a general object of at least one embodiment of the present invention to provide an information processing apparatus, an information system and a program thereof, that substantially obviates one or more problems caused by the limitations and disadvantages of the related art.

According to an aspect of the exemplary embodiment, an information processing apparatus includes: a motion information generating unit that obtains information on a motion of a first user of the information processing apparatus from an inputting device, which recognizes the motion of the first user, and generates first motion information on the first user; a transmitting unit that receives, from other information processing apparatus via a transmission line, second motion information on a second user of the other information processing apparatus; a motion detecting unit that detects a first kind of motion corresponding to the first motion information and a second kind of motion corresponding to the second motion information based on motion correspondence information, which relates motion information to a kind of motion; a delay detecting unit that detects a transmission delay on the transmission line between the information processing apparatus and the other information processing apparatus; a judging unit that judges whether modifying an object is necessary or not based on the first kind of motion, the second kind of motion and the transmission delay, the object representing a motion of the second user based on the second motion information; a modifying unit that modifies the second motion information, when modifying the object is necessary; and an object generating unit that generates the object based on the second motion information.

According to another aspect of the exemplary embodiment, an information processing system includes an information processing apparatus and other information processing apparatus connected via a transmission line, and a communication between the information processing apparatus and the other information processing apparatus is performed. The information processing apparatus includes: a motion information generating unit that obtains information on a motion of a first user of the information processing apparatus from an inputting device, which recognizes the motion of the first user, and generates first motion information on the first user;

a transmitting unit that receives, from the other information processing apparatus via the transmission line, second motion information on a second user of the other information processing apparatus; a motion detecting unit that detects a first kind of motion corresponding to the first motion information and a second kind of motion corresponding to the second motion information based on motion correspondence information, which relates motion information to a kind of motion; a delay detecting unit that detects a transmission delay on the transmission line between the information processing apparatus and the other information processing apparatus; a judging unit that judges whether modifying an object is necessary or not based on the first kind of motion, the second kind of motion and the transmission delay, the object representing a motion of the second user based on the second motion information and displayed to the first user; a modifying unit that modifies the second motion information, when modifying the object is necessary; and an object generating unit that generates the object based on the second motion information.

According to yet another aspect of the exemplary embodiment, a non-transitory computer-readable storage medium stores a program for causing a computer to perform a process of communicating between an information processing apparatus and other information processing apparatus connected via a transmission line. The process includes: a step of obtaining information on a motion of a first user from an inputting device, which recognizes the motion of the first user, and generating first motion information on the first user; a step of receiving, from the other information processing apparatus via the transmission line, second motion information on a second user of the other information processing apparatus; a step of detecting a first kind of motion corresponding to the first motion information and a second kind of motion corresponding to the second motion information based on motion correspondence information, which relates motion information to a kind of motion; a step of detecting a transmission delay on the transmission line between the information processing apparatus and the other information processing apparatus; a step of judging whether modifying an object is necessary or not based on the first kind of motion, the second kind of motion and the transmission delay, the object representing a motion of the second user based on the second motion information and displayed to the first user; a step of modifying the second motion information, when modifying the object is necessary; and a step of generating the object based on the second motion information.

According to the exemplary embodiments, in a communication via transmitting line a smooth and natural communication is possible without putting a load on a bandwidth.

BRIEF DESCRIPTION OF THE DRAWINGS

Other objects and further features of embodiments will be apparent from the following detailed description when read in conjunction with the accompanying drawings, in which:

FIG. 7 is a table illustrating an example of motion correspondence information according to the exemplary embodiment;

FIG. 8 is a table illustrating an example of information on modifiability according to the exemplary embodiment;

FIG. 9 is a table illustrating an example of information on requirement for response according to the exemplary embodiment;

FIG. 10 is a table illustrating an example of information on modifying motion according to the exemplary embodiment;

FIG. 11 is a table illustrating another example of information on modifying motion according to the exemplary embodiment;

FIG. 12 is a table illustrating yet another example of information on modifying motion according to the exemplary embodiment;

FIG. 19 is a table illustrating an example of timing for modifying and motion before and after the modification.

DESCRIPTION OF THE PREFERRED EMBODIMENTS

In the following, embodiments of the present invention will be described with reference to the accompanying drawings.

Exemplary Embodiment

[System]

Figure 1:
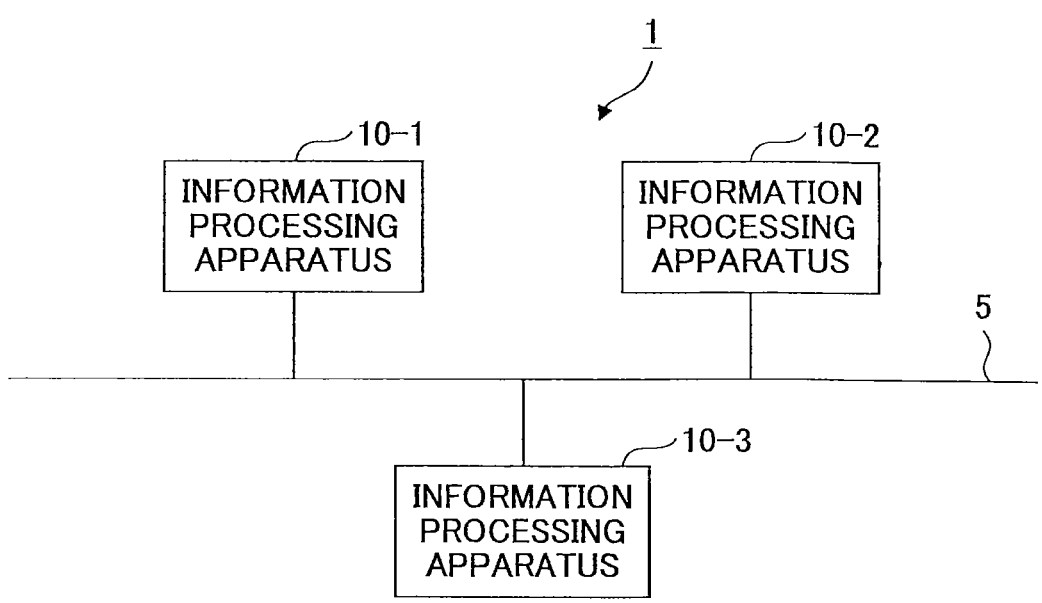
FIG. 1 is a diagram illustrating an example of a configuration of an information processing system according to an exemplary embodiment.

FIG. 1 is a diagram illustrating an example of a configuration of an information processing system according to the first exemplary embodiment. The system as shown in FIG. 1 is a system, in which plural apparatuses are connected via transmission line and the apparatuses communicate with each other. The system as shown in FIG. 1 is, for example, a remote conference system or the like.

In FIG. 1, an information processing system 1 includes information processing apparatuses 10-1 to 10-3. The information processing apparatuses are connected with each other via a transmission line 5. The number of the information processing apparatuses is not limited to 3, but may be any number, more than 1. The transmission line 5 may be any line, on which data transmission is possible. It may be a wired or wireless Local Area Network (LAN), a communication network such as a Wide Area Network (WAN), or the like.

Moreover, each of the information processing apparatuses 10-1 to 10-3 will be denoted as an information processing apparatus 10 in the following, unless each of the information processing apparatuses is to be distinguished.

The information processing apparatus 10 is also called a "client terminal", and used for a conference via a network. The information processing apparatus 10 is, for example, a personal computer (PC), a tablet terminal, a terminal apparatus dedicated to a TV conference, or the like.

In the present exemplary embodiment, a TV conference as an example of the communication via the transmission line 5 will be exemplified. When users conduct a conference via a network by using information processing apparatuses, each information processing apparatus 10 obtains a delay for sending or receiving during the transmission.

The information processing apparatus 10 compares the delay obtained as above and a threshold for the delay stored in each information processing apparatus 10. The information processing apparatus 10 judges how to display an object, which represents a motion of the other user, based on a result of the comparison, and based on motion information on the user of the information processing apparatus and on a user of the other information processing apparatus.

The information processing apparatus 10, modifies the object as necessary, and displays the object to the user. The object may be, for example, a two-dimensional (2D) or three-dimensional (3D) image of a character, such as an avatar.

Moreover, the information processing system 1 may include a server which controls data flow from or to each of the data processing apparatuses.

[Configuration]

Figure 2:
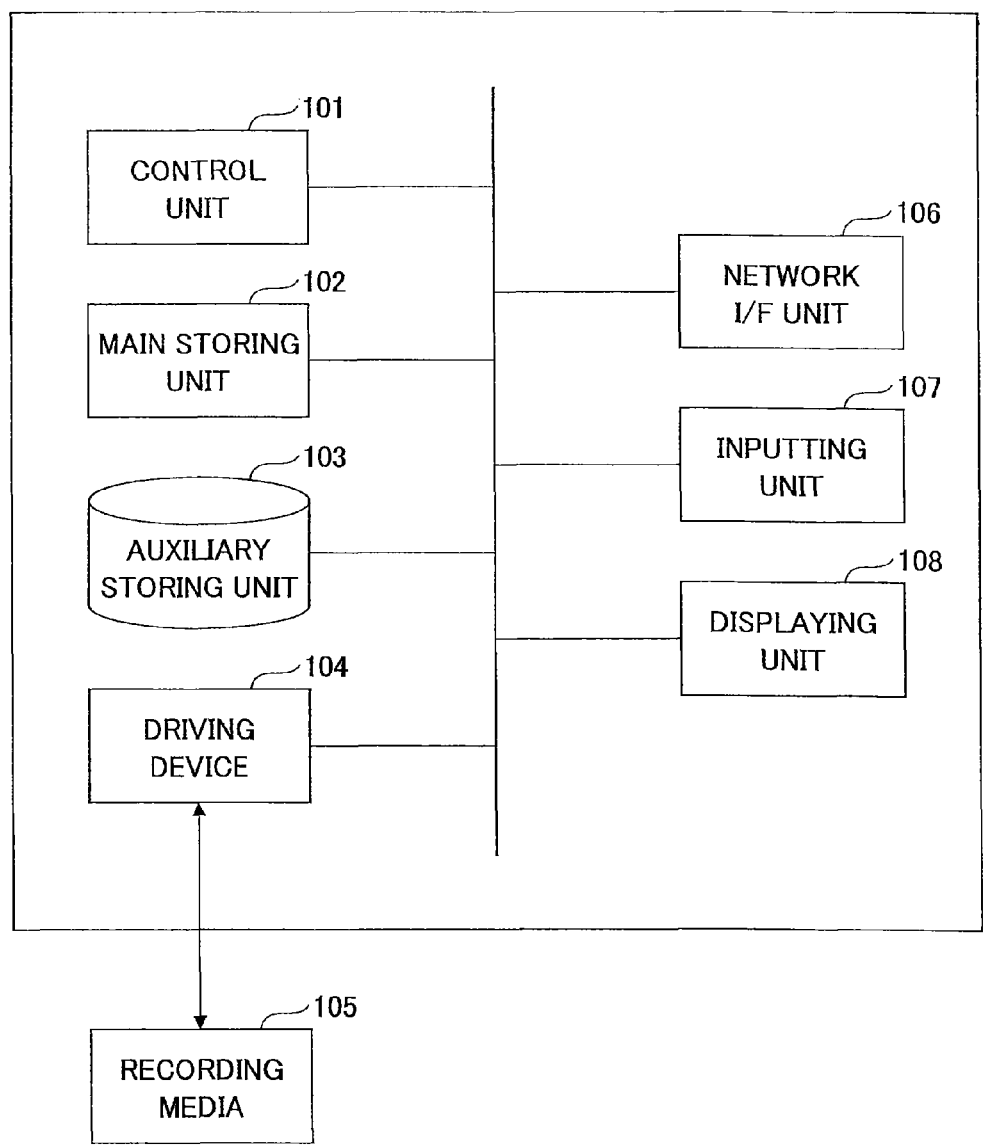
FIG. 2 is a block diagram illustrating an example of a configuration of an information processing apparatus according to the exemplary embodiment.

FIG. 2 shows a block diagram illustrating an example of a configuration of the information processing apparatus 10 according to the present exemplary embodiment. The information processing apparatus 10, shown in FIG. 2 includes a control unit 101, a main storing unit 102, an auxiliary storing unit 103, a driving unit 104, a network interface (I/F) unit 106, an inputting unit 107 and a displaying unit 108. The units are connected to a bus, so that data are sent and received via the bus.

The control unit 101 is a central processing unit (CPU), which controls other units and calculates and processes data in the information processing apparatus. Furthermore, the control unit 101 executes a communication control program stored in the main storing unit 102 or the auxiliary storing unit 103. The control unit 101 receives data from the inputting unit 107 and the storing units 102 and 103, performs calculation and processing for the received data, and outputs the data to the displaying unit or the storing units 102 and 103.

The main storing unit 102 is a read-only memory (ROM), random access memory (RAM), or the like. The main storing unit 102 stores or temporarily holds data or a program, such as an operating system (OS) or an application software, which are executed in the control unit 101.

The auxiliary storing unit 103 is a hard disk drive (HDD) or the like, and stores data related to the application software.

The driving unit 104 reads out a program from a recording media 105, such as an SD (secure digital) card, and installs the program to the storing unit. The communication control program may be stored in the recording media 105. The communication control program may be installed into the information processing apparatus 10 via the driving unit 104. The communication control program is executable in the information processing apparatus 10.

The network I/F unit 106 is an interface between the information processing apparatus 10 and a peripheral device having a communication function. The peripheral device is connected to the information processing apparatus 10 via a network, such as LAN or WAN, which includes a wired or wireless data transmission path.

The inputting unit 107 includes a keyboard having a cursor key, a numeric key, and a function key, a mouse or a slide pad, by which a key selection or the like is performed on the displaying unit 108, or the like.

The displaying unit 108 includes a liquid crystal display (LCD) or the like, and displays data corresponding to display data inputted from the control unit 101. Moreover, the displaying unit 108 may be separated from the information processing apparatus 10. In this case, the information processing apparatus 10 includes a display control unit for controlling the displaying unit 108.

[Function]

Figure 3:
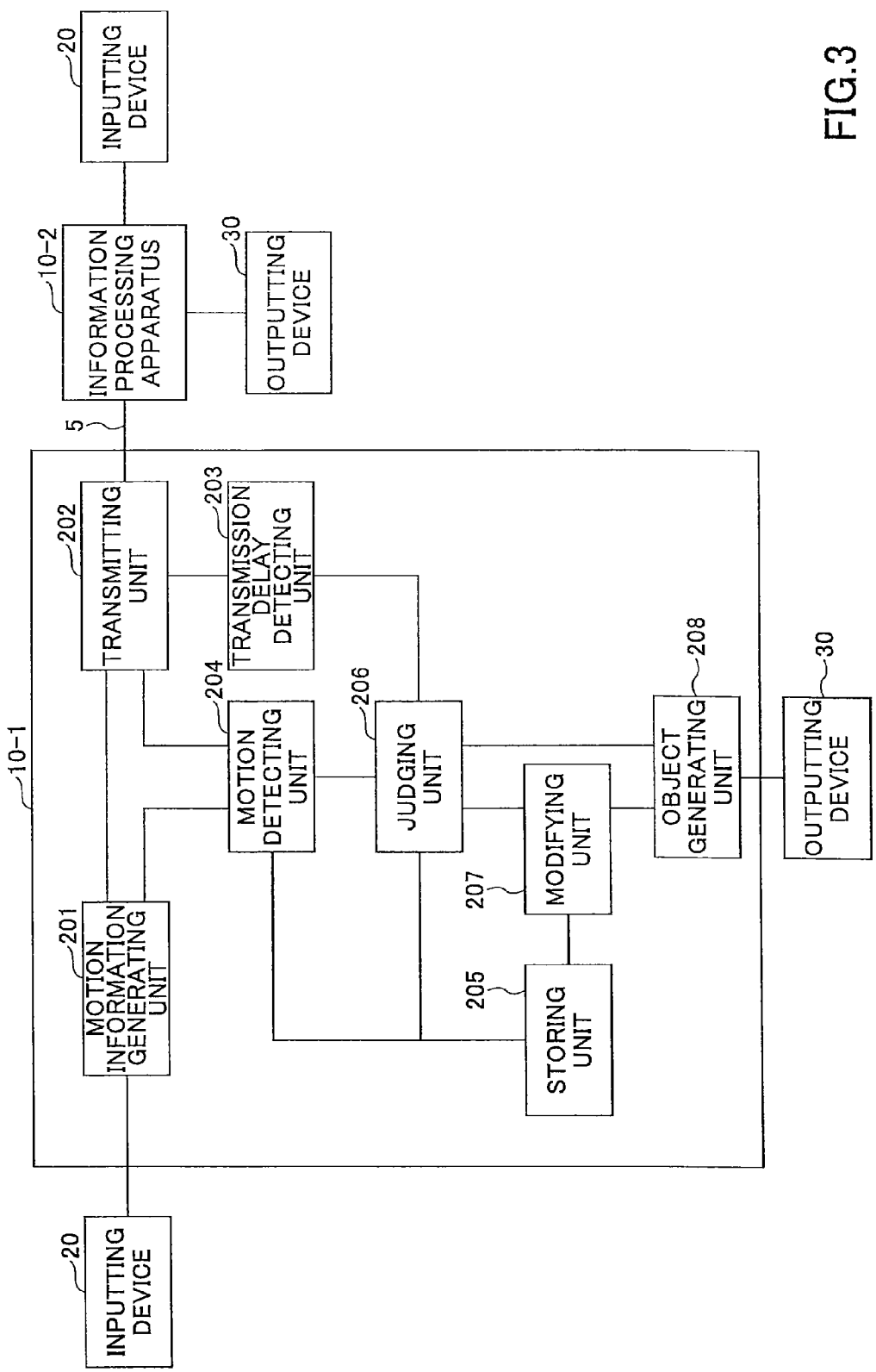
FIG. 3 is a block diagram illustrating an example of a function of the information processing apparatus according to the exemplary embodiment.

FIG. 3 is a block diagram illustrating an example of a function of the information processing apparatus 10-1 according to the present exemplary embodiment. Since the functions of the information processing apparatuses 10-1 to 10-3 are the same, only the function of the information processing apparatus 10-1 will be described in the following.

The information processing apparatus 10-1, exemplified in FIG. 3, acquires information describing a user's motion from an inputting device 20. The inputting device 20 recognizes the user's motion. The inputting device 20 is, for example, a camera, a depth sensor, a microphone, or the like.

Furthermore, the information processing apparatus outputs a generated object to an outputting device 30. The outputting device is, for example, the displaying unit 108, a speaker, or the like.

In FIG. 3, the information processing apparatus 10-1 includes: a motion information generating unit 201, a transmitting unit 202, a transmission delay detecting unit 203, a motion detecting unit 204, a storing unit 205, a judging unit 206, a modifying unit 207 and an object generating unit 208.

The control unit 101 shown in FIG. 2, activates the motion information generating unit 201, the transmission delay detecting unit 203, the motion detecting unit 204, the judging unit 206, the modifying unit 207 and the object generating unit 208, by executing, for example, a communication control program. During the execution of the program, the main storing unit 102 is used as a working memory.

Furthermore, the transmitting unit 202 is realized, for example, by the network I/F unit 106, and the storing unit 205 is realized, for example, by at least one of the auxiliary storing unit 103 and the main storing unit 102.

The motion information generating unit 201 generates motion information indicating information, which is transmitted in communication and includes not only a body motion but also a voice, based on the information acquired from the inputting device 20. The motion information is called as first motion information. The generated motion information is sent to the transmitting unit 202 and the motion detecting unit 204.

The transmitting unit 202 has functions of a sending means and of a receiving means. The transmitting unit 202 sends and receives information used for operation in communication with the other information processing unit 10-2 via the transmitting line 5.

The information used for operation in communication includes information on motion and voice. In the present exemplary embodiment, the transmitting unit 202 prepares the information on motion (the first motion information) based on the information from the inputting device 20, and sends the first motion information to the other information processing apparatus 10-2. The transmitting unit 202 also receives information on motion, which will be denoted as second motion information in the following, from the other information processing apparatus 10-2.

The information on motion is, for example, for an avatar of a 3D model, coordinate values of a base of the object, an orientation of an object in three dimensions, i.e. X, Y and Z, and a rotation angle. The orientation in three dimensions and the rotation angle are called a "quaternion", which is four-dimensional information.

With the quaternion, a state of the object including a position and an orientation can be uniquely identified. The quaternion at each frame is sent and received for controlling motion of the avatar. The information on the 3D model may be shared preliminarily by the users or may be prepared by obtaining independently.

However, an expression of the avatar may be unnatural, if it is prepared only from the positional information. This is because, as can be seen in a general animation, a motion of the expression in the unrealistic avatar is not always the same as the motion of a real human being in order to express the same intension.

For the above problem, the method disclosed in Japanese Patent No. 3593067, for determining an expression, may be employed in the information processing apparatus 10. Information on kinds of expression, such as delight, anger, sorrow, pleasure or the like, may be sent, and on the receiving side, the received expression information may be applied to the model of the receiving side.

Furthermore, the information processing apparatus 10 may include a voice recognition means and a voice synthesizing means. Voice data may be sent as text data, and on the receiving side a voice may be synthesized based on the received text data.

The transmission delay detecting unit 203 detects a transmission delay from the state of the transmission line 5. The transmission delay provided by the transmission delay detecting unit 203 is, for example, a time period required for transmitting data back and forth between the information processing apparatus and the other information processing apparatus connected via the transmission line 5.

The transmission delay detecting unit 203, for example, may issue a ping command and measure a time, to obtain the transmission delay. The transmission delay detecting unit 203 outputs the detected transmission delay to the judging unit 206.

The motion detecting unit 204 obtains, based on motion correspondence information which relates motion information to a kind of motion, a first kind of motion corresponding to the first motion information and a second kind of motion corresponding to the second motion information. The first kind of motion represents a kind of a user's motion on the information processing apparatus, and the second kind of motion represents a kind of another user's motion on the other information processing apparatus. The motion correspondence information is stored in the storing unit 205, which will be explained later.

The motion detecting unit 204, for example, judges whether motion information (second motion information) sent from the transmitting unit 202 corresponds to any of the motion information in the motion correspondence information. If the second motion information corresponds to the motion information in the motion correspondence information, a kind of motion (second kind of motion) corresponding to the motion information is identified.

The motion detecting unit 204 adds the identified kind of motion in terms of, for example, metadata to the motion information, and outputs the modified motion information to the judging unit 206. The metadata is, for example, during speaking, nodding the head, shaking the head, looking away, moving the hand, no motion, unclear motion or the like.

Furthermore, the motion detecting unit 204 performs the same operation as above for the motion information acquired from the motion information generation unit 201 (first motion information). The motion detecting unit 204 adds the kind of motion to the motion information, and outputs the modified motion information to the judging unit 206.

The storing unit 205 stores the motion correspondence information, described as above. The motion correspondence information includes a criterion of the motion information, and a kind of motion corresponding to the criterion. The criterion of the motion information is, for example, criterion of time series data of the coordinate values of respective parts of the 3D model.

The object may be, for example, an avatar of a 3D model. The 3D model includes plural "bones" (wireframes) connected via nodes, information on a position of the nodes with respect to the parent object, and quaternions for the "bones".

In order to draw a front arm, for example, a position for drawing the front arm can be identified, by assuming a base point at an elbow joint, which is a node between the front arm and the upper arm, and giving the quaternion with respect to the base point. In the present exemplary embodiment, the object is an avatar, which has a base point at its hip, and bones with the same shapes as those of a human being arranged in the same directions as in the human being.

Furthermore, rotation angles for respective bones are set to be zero degrees when directly facing a camera in an upright position. The configuration of the 3D model, explained as above, may be prepared by using a 3D CG (3-dimensional computer graphics) software, such as Blender (http://www.blender.org/) which is open source.

Moreover, the storing unit also stores information on requirements for response and information on modifiability. According to the information on requirement for response, it is judged whether to require a response or not based on the first kind of motion. According to the information on modifiability, it is judged whether to modify the second motion information, based on the second motion information. Furthermore, the storing unit 205 also stores information on modifying motion, representing how to modify the motion information. Details of the information stored in the storing unit 205 will be explained later with reference to FIGS. 7 to 12.

The judging unit 206 judges whether the object to be displayed is modified or not based on the first kind of motion, the second kind of motion, and the transmission delay. The judgments by the judging unit 206 are, for example, based on whether a response is required during motion changing since the first kind of motion in the past until the first kind of motion at present, whether the second kind of motion has been allowed to be modified, and comparison between the transmission delay and a threshold value. The judging unit 206 judges the object to be modified when the user is judged to desire a response to the motion.

The judging unit 206 outputs the information used for the judgment to the modifying unit 207, when the object is judged to be modified. The judging unit 206 outputs the second motion information to the object generating unit 208, when the object is judged not to be modified. The judging unit 206 may output the first motion information to the object generating unit 208, if necessary.

The modifying unit 207 modifies the second motion information, when the judging unit 206 judges the object to be modified. The modifying unit 207 may determine a content to be modified in the second motion information and a start time of modifying the second motion information according to a type of the change in the first kind of motion based on the information on modifying motion stored in the storing unit 205. According to the motion on the information processing apparatus side, it is possible to determine the content to be modified and the start time of the modifying of the second motion information on the other information processing apparatus side.

Furthermore, the modifying unit 207 may include plural contents to be modified according to the type of the change in the first kind of motion, based on the information on modifying motion stored in the storing unit 205, and may select one of the contents to be modified randomly. According to the above operation, the user's receiving the same response by the object, each time the object is modified, is prevented.

Furthermore, the modifying unit 207, for example, may determine the content to be modified of the second motion information and the start time of the modifying the second motion information based on the information on modifying motion stored in the storing unit 205, according to the change in the first kind of motion and the delay time. The content to be modified of the motion and the start time may be changed according to the length of the transmission delay.

The modifying unit 207 outputs the second motion information modified according to any of the methods described above to the object generating unit 208.

The object generating unit 208 generates the object based on the second motion information modified by the modifying unit 207 or the second motion information acquired from the judging unit 206. The object generating unit 208 outputs the generated object to the outputting device 30. Information on the object to be displayed on the outputting device 30 may be stored in the information processing apparatus 10-1 preliminarily or may be provided from the other information processing apparatus at the beginning of a conference.

Figure 4A:
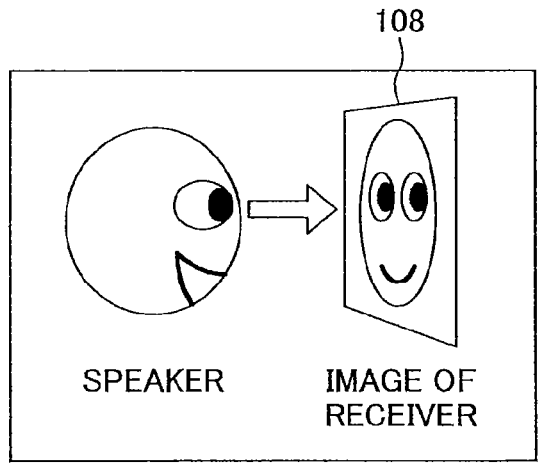
FIGS. 4A and 4B are diagrams illustrating an example of modification of a motion according to the exemplary embodiment.
Figure 4B:
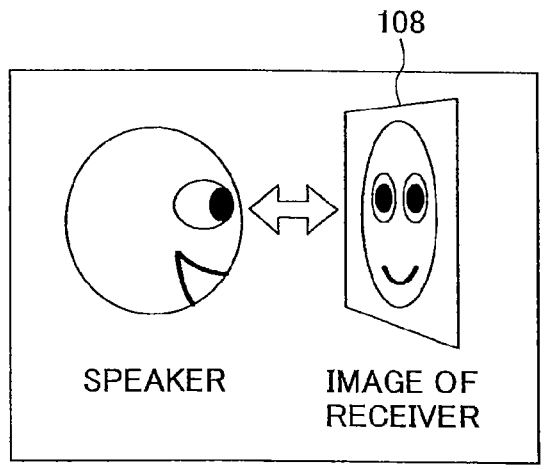

An example for modifying a motion by the modifying unit 207 will be described here. FIGS. 4A and 4B show an example for modifying the motion. FIG. 4A shows an expression of a receiver, when a speaker begins speaking, the receiver looks away.

In the face-to-face communication, the receiver promptly shows a response, such as transferring the gaze to the speaker. The speaker and the receiver can make eye contact. However, in the case that the transfer delay is long, an image of the receiver transferring the gaze to the speaker is displayed on the displaying unit 108 after the delay time. The information processing apparatus 10 according to the present exemplary embodiment, modifies the displayed motion of the receiver, when the transmission delay is known in advance to be longer than a threshold.

FIG. 4B shows an expression of the receiver, after modifying the motion. As shown in FIG. 4B, the modifying unit 207 modifies the motion of the receiver so that the receiver looks at the speaker. The object generating unit 208 outputs the modified object to the displaying unit 108. According to the above operation, natural eye contact becomes possible.

There are several methods have been proposed of sending and receiving expressions and motions of the body among communication methods, by using the transmission line 5. For generating the motion information by the motion information processing unit, sending and receiving the information by the transmitting unit and detecting a transmission delay by the transmission delay detecting unit in the system according to the present exemplary embodiment, the method of such related arts may be employed.

For example, Japanese Published Patent Applications No. 2003-016475, 2009-77380, and 2010-239393 disclose such communication methods. Especially, Japanese Published Patent Application No. 2010-239393 discloses a system having a means for obtaining a transmission delay from the transmission line 5, and conducting a conference by using models.

<Timing of Modification>

Figure 5:
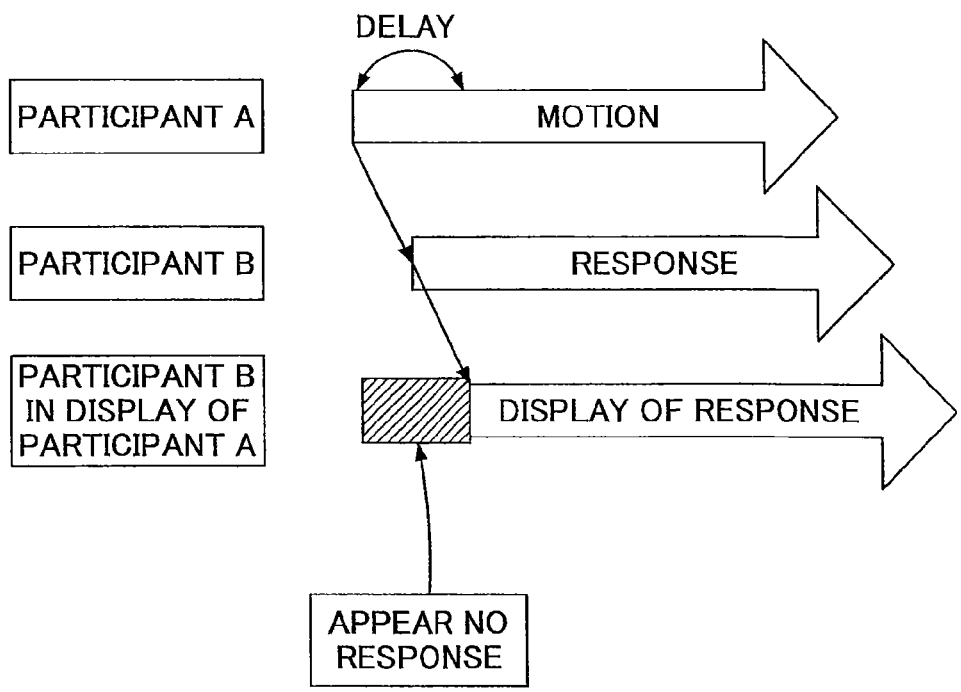
FIG. 5 is a diagram illustrating an influence of a delay when a speaker begins speaking according to the exemplary embodiment.

Next, the timing of the modification in the information processing apparatus according to the present exemplary embodiment will be explained as follows. FIG. 5 is a diagram illustrating an influence of the delay when the speaker begins speaking. In face-to-face communication, the receiver responds soon after an utterance. However, under the circumstances where the communication delays, as shown in FIG. 5, a time lag occurs before the speaker receives the response. The speaker may recognize that the receiver does not respond, and may have a feeling of uncertainty.

During the time period which may be regarded as no response (hatched part), the participant B, who is the receiver, does not ignore the speaking, but the speaker views the display as shown in FIG. 4A. The participant A, who is the speaker, may feel that though the participant A speaks, the participant B ignores the speaker according to the display of FIG. 4A.

Figure 6:
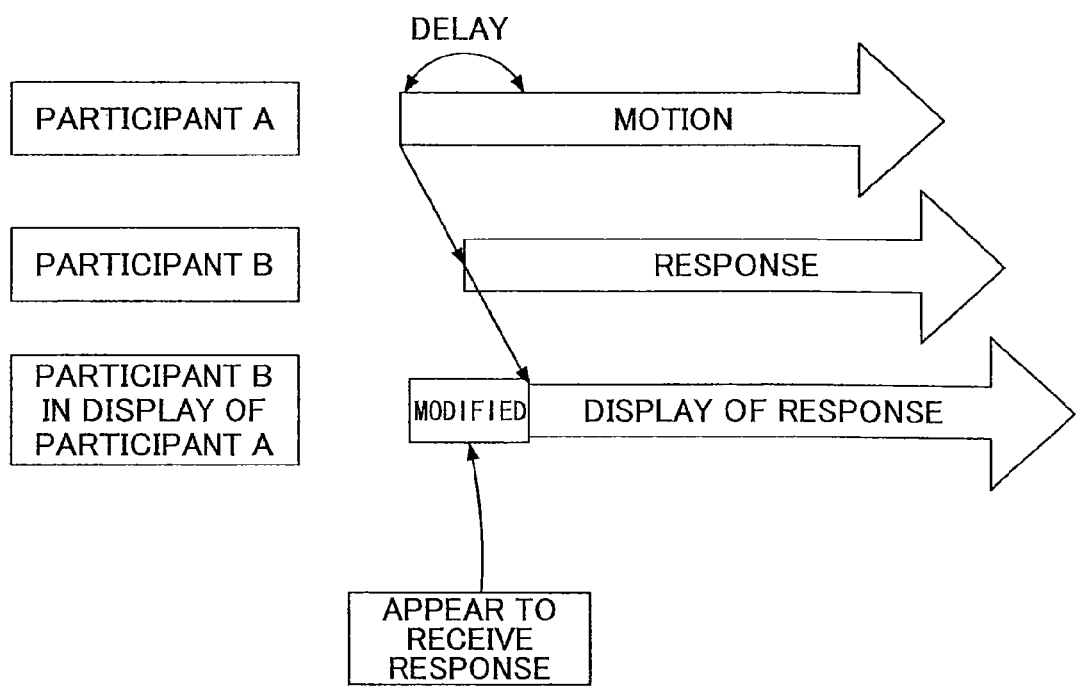
FIG. 6 is a diagram illustrating a timing of modifying motion according to the exemplary embodiment.

FIG. 6 is a diagram illustrating the timing of the modifying motion. In FIG. 6, during the time period where the response does not arrive due to the delay, the motion information of the receiver is modified and the speaker views the modified information. According to the modification of the motion information, the speaker's recognition of the absence of the response due to the delay is prevented.

In the time period which may be regarded as no response (hatched part) as shown in FIG. 5, for example, the motion of the receiver is modified as shown in FIG. 6, and the motion when the receiver does not detect the utterance is concealed. The modification of the motion reduces the delay length, and the feeling of uncertainty by the speaker is inhibited.

<Example of Data>

Next, an example of the data stored in the storing unit 205 will be explained in the following. FIG. 7 is a table illustrating an example of the motion correspondence information. FIG. 7 illustrates a relation among the kind of motion, the criterion of the motion information and a label.

The label "2" designates the kind of motion "look away", corresponding to the criterion "at a certain time point, a rotation angle of a face is greater than or equal to a threshold value with respect to the directly facing direction". The motion detecting unit 204 identifies, when the acquired motion information corresponds to or is relevant to the criterion of the motion information, the label and the kind of motion corresponding to or relevant to the motion information. Moreover, the motion correspondence information shown in FIG. 7 is an example, and may include other kind of motion.

FIG. 8 is a table illustrating an example of the information on modifiability. The information on modifiability illustrates a relation among the kind of motion, the modifiability and a label. The label "2", for example designates the kind of motion "look away", corresponding to the modifiability "yes". The modifiability may be represented by 0 or 1.

The judging unit 206 judges the modifiability for the second kind of motion acquired from the motion detecting unit 204, referring to the modifiability information shown in FIG. 8.

FIG. 9 is a table illustrating an example of information on requirements for response. The information on requirements for response illustrates a relation between a label for motion requirement and a motion change as a motion requiring response. The label "2", for example, designates the motion change as the motion requiring response "from not speaking to speaking".

The judging unit 206 judges, for example, whether the change in motion from the first kind of motion previously to the first kind of motion at present corresponds to any of the motion changes in FIG. 9. When the change in motion corresponds to the motion changes in FIG. 9, the judging unit 206 judges the user's motion as the motion requiring a response, which may be denoted as a motion requiring response.

FIG. 10 is a diagram illustrating an example of a first part of information on modifying motion. The information on modifying motion, as shown in FIG. 10, illustrates the relations among a motion requirement label, a content of modifying motion, and a time for beginning the modifying. The motion requirement label "2", for example, designates a modifying motion "looking at the speaker" corresponding to the time for beginning modifying "150 ms later".

The modifying unit 207 determines the modifying motion and the time for beginning the modifying. Then, a content of modifying for motion on the other information processing apparatus side and a time for beginning the modifying can be determined according to the motion of the speaker's information processing apparatus side.

FIG. 11 is a diagram illustrating an example of a second part of the information on modifying motion. The information on modifying motion, as shown in FIG. 11, illustrates the relations among a motion requirement label, one or plural contents of modifying motion and a time for beginning the modifying. The motion requirement label "2", for example, designates a modifying motion "looking at the speaker" or "nodding a head", corresponding to the time for beginning modifying "150 ms later".

The modifying unit 207 selects, when plural modifying motions correspond to the motion requirement label acquired from the judging unit 206, one of the modifying motions randomly. According to the operation, the user receiving the same response by the object, each time the object is modified, is prevented.

FIG. 12 is a table illustrating an example of a third part of the information on modifying motion. The information on modifying motion, as shown in FIG. 12, illustrates relations among a motion requirement label, a delay time, a modifying motion and a time for beginning the modifying. The motion requirement label "2" and the delay time "300 to 600 ms", designate the modifying motion "looking at the speaker" corresponding to the time for beginning modifying "150 ms later".

For the same motion requirement label, therefore, different modifying motions or different times for beginning of modifying are designated according to the length of the delay time. The modifying unit 207 determines the modifying motion and the time for beginning of modifying according to the motion requirement label and the delay time acquired from the judging unit 206. The determination changes a content of modifying motion and a time for beginning according to the length of the delay time.

<Operation>

Next, the operation in the information processing apparatus according to the present information processing apparatus will be described as follows. The whole information processing is explained, and then each process is explained in detail.

Figure 13:
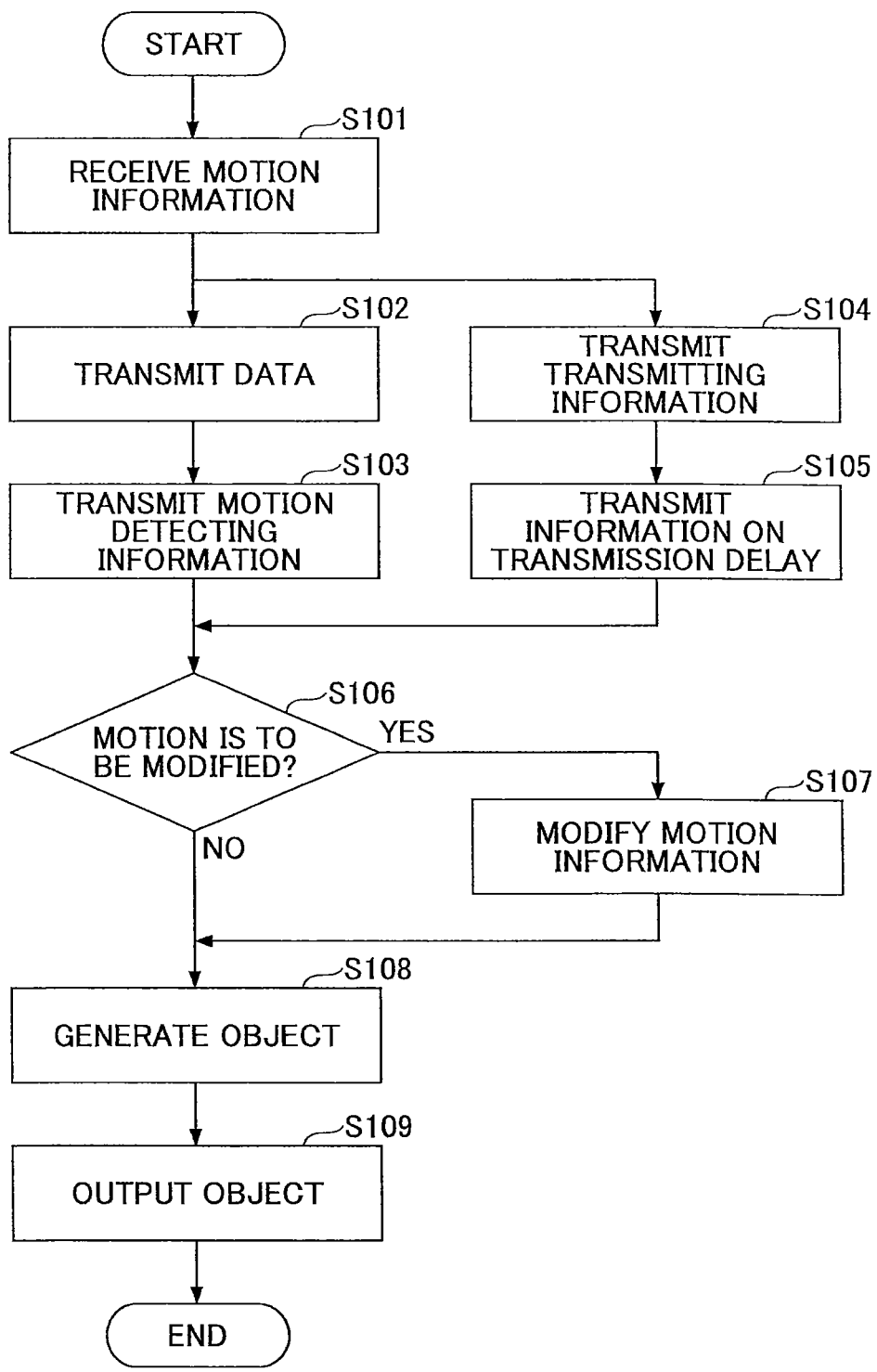
FIG. 13 is a flowchart illustrating an example of processing image data according to the exemplary embodiment.

FIG. 13 shows a flowchart illustrating an example of processing image data according to the present exemplary embodiment. The transmitting unit 202 receives the second motion information from the other information processing apparatus 10 (Step S101 of FIG. 13).

The transmitting unit 202 transmits the received second motion information to the motion detecting unit 204 (Step S102). Moreover, the motion information generating unit 201 generates a first motion information based on information inputted from the inputting device 20, and outputs the first motion information to the motion detecting unit 204.

The motion detecting unit 204 identifies a first kind of motion and a second kind of motion corresponding respectively to the acquired first motion information and the acquired second motion information, referring to the motion correspondence information stored in the storing unit 205 (Step S103). The motion correspondence information including the identified first and second kinds of motion is transmitted to the judging unit 206.

The transmitting unit 206 transmits the transmitting information at the time of receiving the second motion information to the transmission delay detecting unit 203 (Step S104).

The transmission delay detecting unit 203, detects a transmission delay based on the acquired transmission information, and accumulates the detected transmission delay (Step S105). The transmission delay detecting unit 203 transmits the latest information on transmission delay to the judging unit 206, when the judging unit 206 conducts judging. The latest information on transmission delay may be information on the latest transmission delay or may be an average of delay lengths measured within the latest predetermined time period.

The judging unit 206 judges whether to modify the second motion information based on the first kind of motion, the second kind of motion and transmission delay (Step S106). The judging unit 206, for example, judges the second motion information to be modified, if the transmission delay is longer than a threshold, e.g. 300 ms, the second kind of motion is modifiable and the motion change of the first kind of motion is a response requiring motion.

When the judging unit 206 judges the second motion information to be modified (Step S106 YES), the process proceeds to Step S107. If the second motion information is judged not to be modified (Step S106 NO) the process proceeds to Step S108.

The object generating unit 208 generates an object based on the second motion information acquired from the judging unit 206 or from the modifying unit 207 (Step S108).

The object generating unit 208 outputs the generated object to the outputting device 30 (Step S109).

Next, the processings of the main parts, i.e. the motion detecting unit 204, the judging unit 206, and the modifying unit 207, will be explained in the following.

(Motion Detecting Process)

Firstly, the process for the second motion information received from the other information processing apparatus 10 will be explained. The motion detecting unit 204 detects an intentional or unintentional motion of a user (denoted in the following as predetermined motion) when the user conducts a communication.

As a response to a word or an action of the other side in the communication, a motion such as nodding a head or moving a hand corresponds to the predetermined motion. Detecting the predetermined motion may be expressed by, in the case that the motion is included in the criteria shown in FIG. 7, assigning a label to the motion.

In the detecting the predetermined motion in the present exemplary embodiment, plural labels may be assigned to the motion. For example, moving a hand while speaking corresponds simultaneously to two criteria shown in FIG. 7, and the labels 4 and 5 are assigned simultaneously to the series of motion. The motion detecting unit 204 outputs the second motion information, to which the labels are assigned, to the judging unit 206. The labels correspond to the second kinds of motion.

Moreover, the motion detecting unit 204 performs the same process for the first motion information acquired from the motion information generating unit 201. That is, the motion detecting unit 204 outputs the first motion information, to which a label is assigned, to the judging unit 206. The label corresponds to the first kind of motion.

The motion detecting process, described as above, is performed based on, for example, a motion recognition or an expression recognition. The motion recognition and the expression recognition are performed by, for example, comparing the motion detected within a predetermined period of time, e.g. less than a few seconds, with a criterion included in the motion correspondence information stored in the storing unit 205.

(Judging Process)

The judging unit 206 performs judging of modifiability, judging of motion requiring response, judging of transmission delay threshold, judging of modifying motion. These judgings are explained as follows.

The judging unit 206 judges the modifiability for the second motion information, referring to the information on modifiability as shown in FIG. 8. The user's motion is distinguished according to whether the motion has a peculiar meaning or not.

Giving back-channel feedback, spontaneously moving a body, or the like, may be, for example, replaced by modifying, a new motion may be added to, or may be cancelled, without a serious problem.

However, in the case of expressing a shape by motion of a hand, the communication would be degraded if other motions are appended, or the motion is replace by the other motion. Accordingly, the judging unit 206 judges at first whether the motion by the user on the other side would be modifiable.

It is, for example, assumed here that the motion detecting unit 204 detects slightly swinging of the body, corresponding to no motion of label 6 in the example of FIG. 8, or nodding the head while listening to the speaker, corresponding to nodding the head of label 1.

These motions have no special meaning in communications, or merely occur at some timing. In the information on modifiability shown in FIG. 8, the modifiability for the labels 1 and 6 are both "yes", and can be modified.

Furthermore, the motion, such as moving a hand while speaking, i.e. labels 4 and 5 as shown in FIG. 7) would have a special meaning as non-verbal information. Accordingly, for the labels 4 and 5, the information on modifiability shown in FIG. 8 are both "no", and the motion information cannot be modified. Accordingly, the judging unit 206 judges whether the second motion information can be modified or not based on the second kind of motion.

The judging unit 206 further judges whether the received second motion information is to be modified or not based on how the user's motion on the information processing apparatus side has changed. This is because that if the user's motion on the information processing apparatus side is a motion which does not require a response of the other side, modifying the motion of the other side would be unnecessary. The series of motion requiring a response of the other side will be denoted as a motion requiring response.

The judging unit 206 judges whether the change in the first motion is a motion requiring response or not. When the first kind of motion changes within a predetermined period of time, and the content of change is included in the motion requiring response as shown in FIG. 9, the motion change is judged as a motion requiring response. Moreover, to "not speaking" shown in FIG. 9 labels other than label 5 are assigned, and to "not looking away" labels other than label 2 are assigned.

When the judging unit 206 detects a motion requiring response, i.e. judges that the motion includes a timing requiring a response, the judging unit 206 assigns a motion requirement label to the second motion information, and outputs the second motion information to the modifying unit 207. If the motion requiring response is not detected, the second motion information is outputted to the object generating unit 208.

Figure 14:
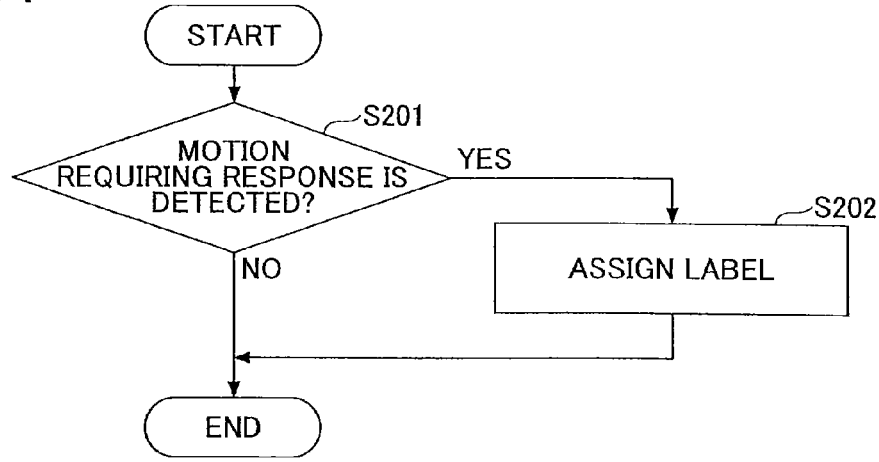
FIG. 14 is a flowchart illustrating an example of judging processing for motion requiring response according to the exemplary embodiment.

FIG. 14 is a flowchart illustrating an example of judging processing for motion requiring response according to the present exemplary embodiment. When the judging unit 206 detects a change in the first kind of motion within a predetermined time period, the judging unit 206 judges whether the motion change is included in the information on requirement for response or not (FIG. 14, Step S201).

When the detected motion change is included in the information on requirement for response (Step S201 YES), the judging unit 206 detects a motion requiring response, and the process proceeds to Step S202. When the motion change is not included in the information on requirement for response (Step S201 NO), the motion requiring response is not detected.

The judging unit 206 assigns the detected motion requirement label to the second motion information. Then, when the motion requirement label is assigned to the second motion information, a response is judged to be required.

Furthermore, the judging unit 206 judges whether the transmission delay is greater than a threshold or not. The judging unit 206 cannot measure a delay between the information processing apparatus and the client terminal of the other side of the transmission, before initiating the communication. The initial state of the transmission delay detecting unit 203 is, therefore, that the delay is less than the threshold.

The judging unit 206 judges, after the communication begins, whether the transmission delay is greater than or equal to a predetermined threshold or not. Since a delay in processing in the information processing apparatus of in the outputting device 30 differs, and the user's sensibility differs, the threshold for delay in communications may be different. Accordingly, the threshold used for the judgment may be changed arbitrarily depending to the configurations.

Figure 15:
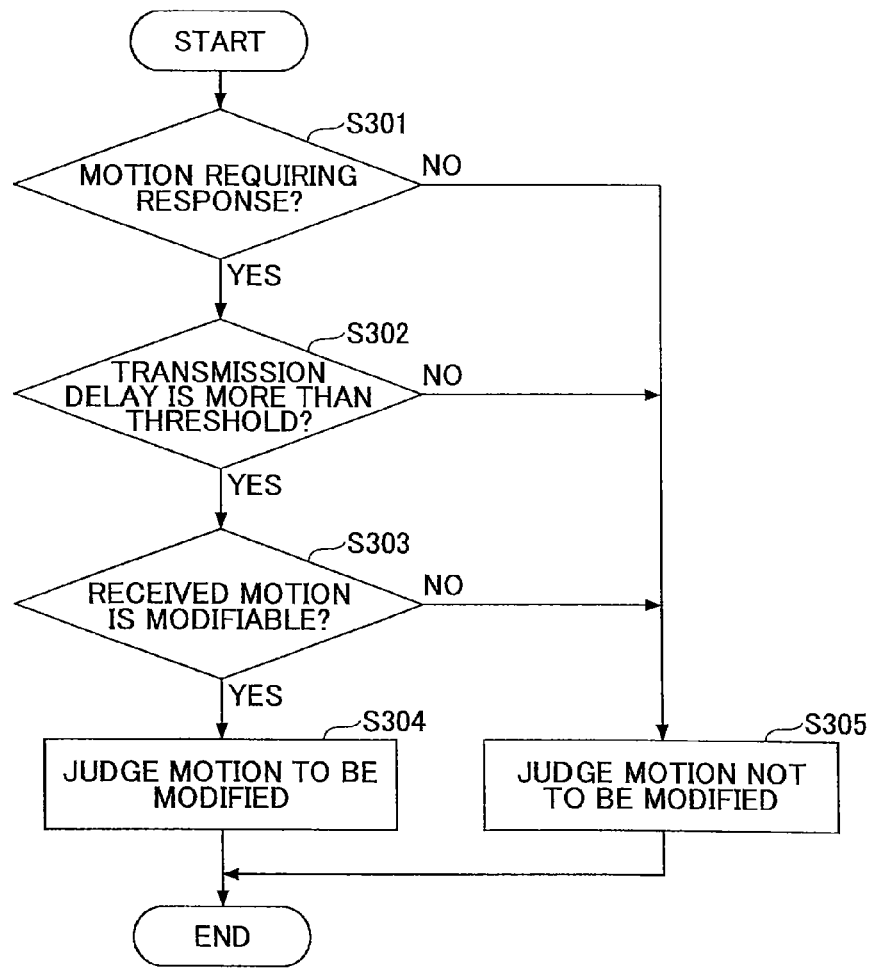
FIG. 15 is a flowchart illustrating an example of judging processing for motion modification according to the exemplary embodiment.

The judging unit 206 judges the motion modification based on the result of the judgment of modifiability, the judgment of motion requiring response and the judgment of transmission delay threshold. FIG. 15 is a flowchart illustrating an example of the judging processing for motion modification according to the present exemplary embodiment.

The judging unit 206 judges whether the change in the first kind of motion is a motion requiring response or not (FIG. 15, Step S301). When the change is the motion requiring response (Step S301 YES), the process proceeds to step S302. When the change is not the motion requiring response (Step S301 NO), the process proceeds to step S305.

The judging unit 206 judges whether the transmission delay is greater than or equal to the threshold or not (Step S302). If the transmission delay is greater than or equal to the threshold (Step S302 YES), the process proceeds to S303. If the transmission delay is less than the threshold (Step S302 NO), the process proceeds to S305.

The judging unit 206 judges whether the motion received from other information processing apparatus is modifiable or not (Step S303). If the received motion is modifiable (Step S303 YES), the process proceeds to Step S304. If the received motion is not modifiable (Step S303 NO), the process proceeds to Step S305. Moreover, the order of steps S301 to S303 is arbitrary.

The judging unit 206 judges the motion to be modified at step S304, whereas the judging unit 206 judges the motion not to be modified at step S305. The judging unit 206, according to the above process, judges an appropriate timing for modifying motion.

(Motion Modifying Process)

In the modifying process, a modified motion, to which the motion will be changed, is determined at first. The modified motion is "executing nodding motion", "halting current motion", "transferring gaze", "change expression", or the like. These motions are denoted as modified motions in the following.

As the method of selecting the modified motion, the modifying unit 207 may select a modified motion previously determined, may randomly select a modified motion, or may dynamically select a modified motion. The modifying unit 207 may, for example, select a modified motion based on the information on modifying motion stored in the storing unit 205.

Figure 16:
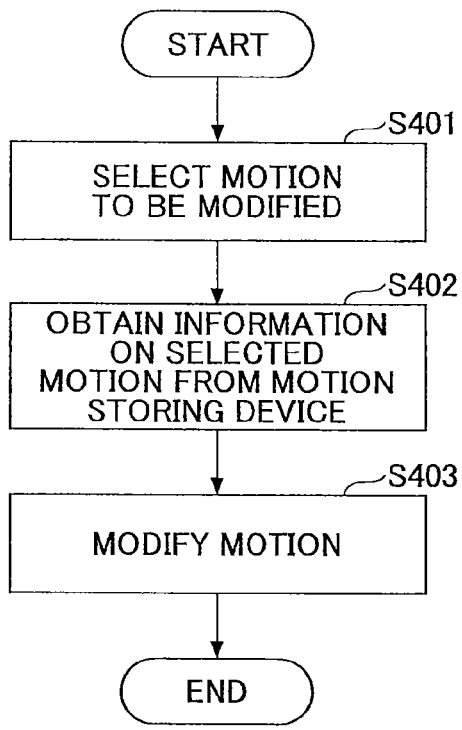
FIG. 16 is a flowchart illustrating an example of processing for modifying motion according to the exemplary embodiment.

FIG. 16 is a flowchart exemplifies the processing for modifying motion according to the present exemplary embodiment. The modifying unit 207 selects the motion to be modified (FIG. 16, step S401). The modifying unit 207 selects the modifying motion according to the change in the first kind of motion using the information on the information on modifying motion, as shown in FIGS. 10-12.

The modifying unit 207, after selecting the modifying motion, obtains motion information of the selected modified motion from the motion correspondence information stored in the stored unit 205 (step S402).

The modifying unit 207 modifies the second motion information using the motion information of the modifying motion (step S403). The modifying unit 206 modifies the motion by, for example, synthesizing motions. The method of synthesizing motions is expressed by overwriting the motion information obtained from the storing unit 205.

The modifying unit, however, does not modify a part obtained from the storing unit 205, the motion of which has not been defined. That is, when the part moves, the modifying unit 207 does not stop the movement of the part.

The modifying unit 207 may select a content of modification or a modifying timing according to the motion requirement label, using the information on modifying motion as shown in FIG. 10. Moreover, the modifying unit 207 may select one of the plural contents of modification and modify the motion, using the information on modifying motion as shown in FIG. 11. The modifying unit 207 may not modify the motion despite the requirement for modification. The time for beginning modification may be predetermined ranges. Furthermore, the modifying unit 207 may perform simultaneously plural modifications using the information on modifying motion as show in FIG. 12. For modifying motions with the same motion requirement label, the contents may be different according to the delay time.

Furthermore, the modifying unit 207 may adjust the content of modification and the timing according to a random number. The modifying unit 207, for example, may generate a random number between −2 to 5. When the random number is a negative number, the motion is not modified. When the random number is positive number, the motion may be delayed by the length determined by the random number, for example, 50 ms for 5.

Since a human being does not always respond at the same timing, the modification is adjusted, such as being modified or not modified, advancing or delaying the timing, and so on as to match the characteristics of the human being. Japanese Published Patent Application No. 2009-077380, for example, discloses the method of modifying a motion of a model.

(Example)

Next, an example of the modifying motion and the timing in the system according to the above-described exemplary embodiment will be explained as follows. In the Example, a camera and a depth sensor are used as the inputting device 20. In the system 1 according to the Example, motion information is generated based on the moving picture taken by the camera, and motion information is generated based on a depth image by the depth sensor.

As the timing of modifying the motion, beginning and finishing of speaking are set. The modification for the motion continues for a time period approximately equivalent to the transmission delay length. After the time period, the system becomes the state where the motion is not modified.

Figure 17:
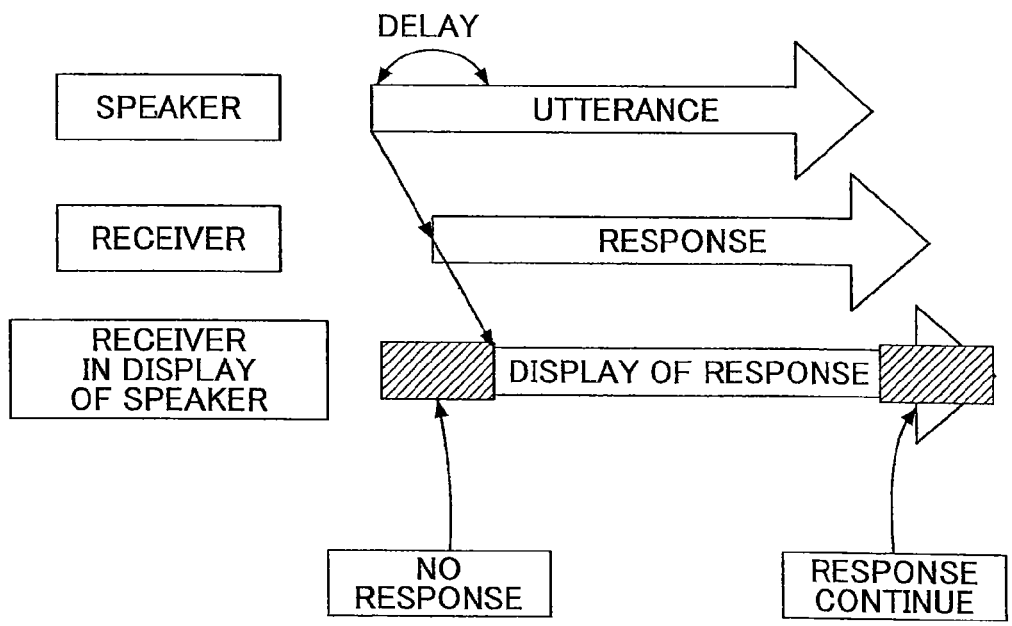
FIG. 17 is a diagram illustrating an example of influence of a transmission delay.
Figure 18:
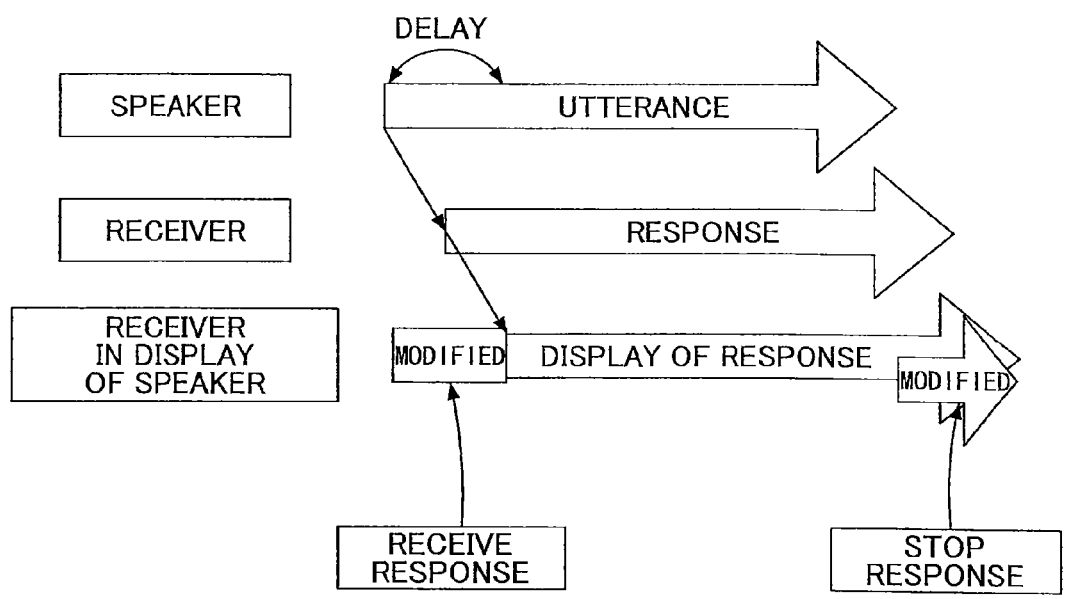
FIG. 18 is a diagram illustrating an example of time period for modifying motion.

FIG. 17 is a diagram illustrating an example of influence of the transmission delay. As shown in FIG. 17, due to the transmission delay, the speaker recognizes a time period where the speaker does not respond during a time period where a response continues. FIG. 18 is a diagram illustrating an example of a time period where the motion is modified. In FIG. 18, in the time period without response and the time period with continued response shown in FIG. 17, the motion modified.

Moreover, the beginning of the speaking is judged according to a voice at the beginning of the speaking. Since the speaker is the user of the information processing apparatus, the user can judge the beginning of the speaking within a small error range. In face-to-face communication, before the beginning of speaking, there may be a preparing operation. The preparing operation may be used for judging the beginning of speaking. See, for example, Hidekazu Tamaki, Suguru Higashino, Minoru Kobayashi and Masayuki Ihara, "Smooth Turn-talking in Web Conferences", the Institute of Image Electronic Engineers of Japan, Proceedings of the 29th Versatile Media Appliance conference, Osaka, January 2011, pp 9-18.

The modifying unit 207 modifies the motion so that the receiver responds as the speaker expects, especially at the beginning and finishing of speaking.

FIG. 19 shows a table illustrating an example of timing for modifying and motion before and after the modification. In FIG. 19, the judging unit 206, as the detecting operation for detecting the motion requiring response, judges the beginning of speaking or the finishing of speaking. At the beginning of speaking, the modifying unit 207 modifies the motion of the receiver so as to transfer the gaze of the receiver to the speaker. Furthermore, at the finishing of speaking, the modifying unit 207 modifies the motion of the receiver so that the receiver nods slightly to the speaker and the response listening to the speaker ends.

Moreover, in the above-described information processing apparatus 10 detects not only speaking but also motion information of a participant. Accordingly, modifying the motion at a timing different from the beginning or finishing of speaking is possible.

Furthermore, kinds of modification, whether modified or not modified, and a timing of modification may be set for each of the information processing apparatus 10. Accordingly, an unnatural operation that plural receivers perform the same motion simultaneously is prevented.

(Example of not Modifying the Motion at the Timing of the Modification)

For a motion of the receiver corresponding to the motion stored in the storing unit 205, which cannot be overwritten, or a motion which is not identified, the modifying unit 207 does not modify the motion, even at the finishing of speaking. This is because that modifying such motion may change the receiver's intention for the motion.

The predetermined motion which cannot be overwritten is, for example, giving a big nod, which would be interpreted as an agreement or affirmation, or shaking the head, interpreted as denial or disagree.

(Example of Motions Stored in the Storing Unit)

In the case where the object is represented by a 3D model composed of rigid bodies, each element is uniquely specified by a quaternion, i.e. a 3-dimensional positional coordinates and a rotation angle. For example, a motion of the nodding is expressed by time series data of the quaternions for the rigid bodies included in a face or a neck.

The time series data of the quaternions are stored in the storing unit 205. Furthermore, by transferring the time series data by the transmitting unit 202, the motion information is transmitted.

According to the Example described as above, in the communication via the transmission line, a smooth and natural communication is possible without putting a load on bandwidth.

Moreover, a program executed in the information processing apparatus 10 according to the Example may be provided in an installable form or in an executable form stored in a recording medium readable by a computer, such as a CD-ROM (Compact disk read-only memory), FD (flexible disk), CD-R (Compact disk recordable), DVD (Digital Versatile Disk).

Furthermore, the program executed in the information processing apparatus 10 according to the Example may be stored in a computer connected to a network, such as internet, and may be provided by downloading via the network.

Moreover, the program executed in the information processing apparatus 10 according to the Example may be provided by previously installing in the ROM (read-only memory).

Further, the present invention is not limited to these embodiments, but various variations and modifications may be made without departing from the scope of the present invention.

The present application is based on Japanese Priority Application No. 2012-264584 filed on Dec. 3, 2012, with the Japanese Patent Office, the entire contents of which are hereby incorporated by reference.

What is claimed is:

1. An information processing apparatus comprising:
circuitry configured to:
obtain information corresponding to a motion of a first user of the information processing apparatus from an inputting device, which recognizes the motion of the first user, and generate first motion information corresponding to the first user;
receive, from other information processing apparatus via a transmission line, second motion information corresponding to a second user of the other information processing apparatus;
detect a first kind of motion corresponding to the first motion information and a second kind of motion corresponding to the second motion information based motion correspondence information, which relates motion information to a kind of motion;
detect a transmission delay on the transmission line between the information processing apparatus and the other information processing apparatus;
judge whether modifying an object is necessary or not based on the first kind of motion of the first user of the information processing apparatus, the second kind of motion of the second user of the other information processing apparatus, and the transmission delay, the object representing an avatar of the second user based on the second motion information and being displayed to the first user;
modify the second motion information when it is judged that modifying the object is necessary; and
generate the object based on the second motion information.

2. The information processing apparatus as claimed in claim 1, wherein the circuitry is configured to judge whether modifying the object is necessary or not based on whether a response is required in response to a change in motion of the first kind of motion, whether the second kind of motion is allowed to be modified, and comparison between the transmission delay and a threshold value.

3. The information processing apparatus as claimed in claim 1, wherein the circuitry is configured to determine content for modification of the second motion information and a start time for modifying the second motion information according to a type of change in motion of the first kind of motion.

4. The information processing apparatus as claimed in claim 3, wherein the circuitry is configured to receive a plurality of contents for the modification of the second motion information corresponding to the type of change in motion of the first kind of motion, and randomly select one content from the plurality of contents.

5. The information processing apparatus as claimed in claim 1, wherein the circuitry is configured to determine content for modification of the second motion information and a start time for modifying the second motion information according to a type of change in motion of the first kind of motion and to the transmission delay.

6. An information processing system, in which an information processing apparatus and other information processing apparatus are connected via a transmission line, and a communication between the information processing apparatus and the other information processing apparatus is performed, wherein the information processing apparatus comprises:
circuitry configured to:
obtain information corresponding to a motion of a first user of the information processing apparatus from an inputting device, which recognizes the motion of the first user, and generate first motion information corresponding to the first user;
receive, from the other information processing apparatus via the transmission line, second motion information corresponding to a second user of the other information processing apparatus;
detect a first kind of motion corresponding to the first motion information and a second kind of motion corresponding to the second motion information based on motion correspondence information, which elates motion information to a kind of motion;
detect a transmission delay on the transmission line between the information processing apparatus and the other information processing apparatus;
judge whether modifying an object is necessary or not based on the first kind of motion of the first user of the information processing apparatus, the second kind of motion of the second user of the other information processing apparatus, and the transmission delay, the object representing an avatar of the second user based on the second motion information and being displayed to the first user;

modify the second motion information when it is judged that modifying the object is necessary; and generate the object based on the second motion information.

7. A non-transitory computer-readable storage medium storing a program for causing a computer to perform a process of communicating between an information processing apparatus and other information processing apparatus connected via a transmission line, the process comprising:

obtaining information corresponding to a motion of a first user of the information processing apparatus from an inputting device, which recognizes the motion of the first user, and generating first motion information corresponding to the first user;

receiving, from the other information processing apparatus via the transmission line, second motion information corresponding to a second user of the other information processing apparatus;

detecting a first kind of motion corresponding to the first motion information and a second kind of motion corresponding to the second motion information based on motion correspondence information, which elates motion information to a kind of motion;

detecting a transmission delay on the transmission line between the information processing apparatus and the other information processing apparatus;

judging whether modifying an object is necessary or not based on the first kind of motion of the first user of the information processing apparatus, the second kind of motion of the second user of the other information processing apparatus, and the transmission delay, the object representing an avatar of the second user based on the second motion information and being displayed to the first user;

modifying the second motion information when it is judged that modifying the object is necessary; and generating the object based on the second motion information.

8. The non-transitory computer-readable storage medium as claimed in claim 7, wherein whether modifying the object is necessary or not is judged based on whether a response is required in response to a change in motion of the first kind of motion, whether the second kind of motion is allowed to be modified, and comparison between the transmission delay and a threshold value.

9. The non-transitory computer-readable storage medium as claimed in claim 7, wherein content for modification of the second motion information and a start time for modifying the second information are determined according to a type of change in motion of the first kind of motion.

10. The non-transitory computer-readable storage medium as claimed in claim 9, further comprising randomly selecting one content from a plurality of contents for modification of the second motion information corresponding to the type of change in motion of the first kind of motion.

11. The non-transitory computer-readable storage medium as claimed in claim 7, wherein content for modification of the second motion information and a start time for modifying the second motion information are determined according to a type of change in motion of the first kind of motion and to the transmission delay.

12. The information processing apparatus as claimed in claim 1, wherein the circuitry is configured to determine whether the transmission delay is greater than or equal to a threshold value, and to judge that modifying the object is necessary when the transmission delay is greater than or equal to the threshold value.

13. The information processing system as claimed in claim 6, wherein the circuitry is configured to determine whether the transmission delay is greater than or equal to a threshold value, and to judge that modifying the object is necessary when the transmission delay is greater than or equal to the threshold value.

14. The non-transitory computer-readable storage medium as claimed in claim 7, further comprising:

determining whether the transmission delay is greater than or equal to a threshold value; and judging that modifying the object is necessary when the transmission delay is greater than or equal to the threshold value.

* * * * *